United States Patent
Kim et al.

(10) Patent No.: US 9,608,712 B2
(45) Date of Patent: Mar. 28, 2017

(54) METHOD AND APPARATUS FOR TRANSMITTING AND RECEIVING SINGLE STREAM THROUGH MULTIPLE BEAMS IN WIRELESS COMMUNICATION SYSTEM

(71) Applicant: Samsung Electronics Co., Ltd., Gyeonggi-do (KR)

(72) Inventors: Chanhong Kim, Gyeonggi-do (KR); Jiyun Seol, Gyeonggi-do (KR); Taeyoung Kim, Gyeonggi-do (KR); Jaeseung Son, Gyeonggi-do (KR); Keonkook Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/677,609

(22) Filed: Apr. 2, 2015

(65) Prior Publication Data
US 2015/0288439 A1  Oct. 8, 2015

(30) Foreign Application Priority Data
Apr. 2, 2014  (KR) .................. 10-2014-0039606

(51) Int. Cl.
| H04L 27/00 | (2006.01) |
| H04B 7/06 | (2006.01) |
| H04B 7/0456 | (2017.01) |
| H04B 7/04 | (2017.01) |

(52) U.S. Cl.
CPC ......... *H04B 7/0691* (2013.01); *H04B 7/0456* (2013.01); *H04B 7/0469* (2013.01); *H04B 7/0634* (2013.01); *H04B 7/0665* (2013.01); *H04B 7/0673* (2013.01); *H04B 7/0639* (2013.01)

(58) Field of Classification Search
CPC .. H04B 7/0691; H04B 7/0456; H04B 7/0469; H04B 7/0634; H04B 7/0673; H04B 7/0665; H04B 7/0639
See application file for complete search history.

(56) References Cited

U.S. PATENT DOCUMENTS

| 2008/0247364 A1 | 10/2008 | Kim et al. | |
| 2009/0036150 A1* | 2/2009 | Liao ..................... | H04B 7/0862 455/501 |
| 2010/0034312 A1* | 2/2010 | Muharemovic ..... | H04L 27/2613 375/267 |

(Continued)

FOREIGN PATENT DOCUMENTS

| KR | 1020150016426 | 2/2015 | |
| WO | WO 2013091524 A1 * | 6/2013 | ........... H04L 1/1861 |

OTHER PUBLICATIONS

International Search Report dated Jun. 29, 2015 issued in counterpart application No. PCT/KR2015/003276, 3 pages.

*Primary Examiner* — Syed Haider
(74) *Attorney, Agent, or Firm* — The Farrell Law Firm, P.C.

(57) ABSTRACT

Methods and apparatuses are provided for controlling a transmission signal in a transceiver. Cyclic shift values that are applied to transmission signals are determined, when the transmission signals are to be transmitted through multiple layers. The transmission signals are cyclically shifted according to the cyclic shift values. The cyclically-shifted transmission signals are added. The added cyclically-shifted transmission signals are transmitted.

17 Claims, 8 Drawing Sheets

(56) References Cited

U.S. PATENT DOCUMENTS

| | | |
|---|---|---|
| 2011/0223870 A1* | 9/2011 | Tujkovic .............. H04B 7/0671 |
| | | 455/73 |
| 2011/0305178 A1 | 12/2011 | Zheng et al. |
| 2012/0077519 A1* | 3/2012 | Suh ...................... H04B 7/0671 |
| | | 455/456.1 |
| 2013/0093624 A1 | 4/2013 | Raczkowski et al. |
| 2013/0155992 A1* | 6/2013 | Yoon ..................... H04L 5/0023 |
| | | 370/329 |
| 2013/0329630 A1 | 12/2013 | Becker |
| 2014/0016714 A1 | 1/2014 | Chen et al. |
| 2014/0050280 A1 | 2/2014 | Stirling-Gallacher et al. |
| 2014/0301324 A1* | 10/2014 | Cheng .................. H04L 1/1861 |
| | | 370/329 |

* cited by examiner

METHOD AND APPARATUS FOR TRANSMITTING AND RECEIVING SINGLE STREAM THROUGH MULTIPLE BEAMS IN WIRELESS COMMUNICATION SYSTEM

PRIORITY

This application claims priority under 35 U.S.C. §119(a) to Korean Patent Application No. 10-2014-0039606, filed on Apr. 2, 2014, the content of which is incorporated herein by reference.

BACKGROUND OF THE INVENTION

1. Field of the Invention

The present invention relates generally to transmission methods of a wireless communication system, and more particularly, to a method and an apparatus for transmitting and receiving a single data stream through multiple beams in a wireless communication system, which uses hybrid beamforming in which a digital precoder is combined with an analog beamformer.

2. Description of the Prior Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Data usage amounts in a wireless communication network are increasing exponentially, and thus, mobile communication technology of subsequent generations (e.g., beyond fourth generation (4G)) needs to enable gigabit-class communication, even in an outdoor environment. In this regard, a beamforming technique in a millimeter band is recently attracting public attention as a candidate technique for gigabit-class communication. The millimeter band is advantageous in that the millimeter band can use a wider band than the existing low frequency band, but is disadvantageous in that the millimeter band has large channel attenuation. A beamforming technique can increase the strength of a signal in a particular direction by using multiple antennas. Since a wavelength has been shortened in a high frequency band, multiple antennas can be integrated in a small area. Accordingly, the beamforming technique is again attracting public attention as an important technique that can overcome the problem of the channel attenuation in the millimeter band.

Beamforming may be implemented according to a digital scheme in a baseband, or according to an analog scheme after Digital/Analog (D/A) conversion or at a Radio Frequency (RF) side.

When the beamforming is implemented only according to the digital scheme, it is easy to adjust a beamforming coefficient, namely, the strength and phase of a signal, but an RF path, which is formed by a series of a baseband, a Digital/Analog Convertor (DAC), and an RF side, needs to be disposed for each antenna. Accordingly, this configuration has difficulties relating to costs and implementation.

When the beamforming is implemented only at the RF side, this configuration is low in cost, but may have difficulty providing minute adjustments for the strength and phase of a signal.

Hybrid beamforming corresponds to a structure in which only several RF paths form a baseband and an RF beamformer is combined for each RF path. The hybrid beamforming allows for transmission of multi-data through a digital precoder, and can obtain beamforming gain through an RF beamformer. Accordingly, a hybrid beamforming technique is advantageous in that the hybrid beamforming technique can select a trade-off position appropriate to prepare for the two extremes of beamforming techniques, namely, a case where beamforming is implemented only according to the digital scheme and another case where the beamforming is implemented only according to the analog scheme.

SUMMARY OF THE INVENTION

The present invention has been made to address at least the above problems and/or disadvantages and to provide at least the advantages described below. Accordingly, an aspect of the present invention provides a method and an apparatus for maintaining an average power of Power Amplifier (PA) input signals to be constant regardless of a combination of beams during transmission of a single stream through multiple beams in such a manner that in a hybrid beamforming structure, the back-off amount of a PA can meet a level identical to that of a PA back-off amount considered by an existing Orthogonal Frequency Division Multiplexing (OFDM) system.

Another aspect of the present invention provides a data transmission/reception procedure and a control information transmission/reception method, which accompany the above-described method and apparatus.

According to an aspect of the present invention, a method is provided for controlling a transmission signal in a transceiver. Cyclic shift values that are applied to transmission signals are determined, when the transmission signals are to be transmitted through multiple layers. The transmission signals are cyclically shifted according to the cyclic shift values. The cyclically-shifted transmission signals are added. The added cyclically-shifted transmission signals are transmitted.

According to another aspect of the present invention, a transceiver is provided that includes a control unit configured to perform a control operation for determining cyclic shift values that are applied to transmission signals when the transmission signals are to be transmitted through multiple layers, and cyclically shifting the transmission signals according to the cyclic shift values. The transceiver also includes a transceiver unit for adding the cyclically-shifted transmission signals, and transmitting the added cyclically-shifted transmission signals to another transceiver.

According to an additional aspect of the present invention, an article of manufacture is provided for controlling a transmission signal, including a non-transitory machine readable medium containing one or more programs, which when executed implement the steps of: determining cyclic shift values that are applied to transmission signals, when the transmission signals are to be transmitted through multiple layers; cyclically shifting the transmission signals according to the cyclic shift values; adding the cyclically-shifted transmission signals; and transmitting the added cyclically-shifted transmission signals.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF THE EMBODIMENTS OF THE PRESENT INVENTION

Figure 1:
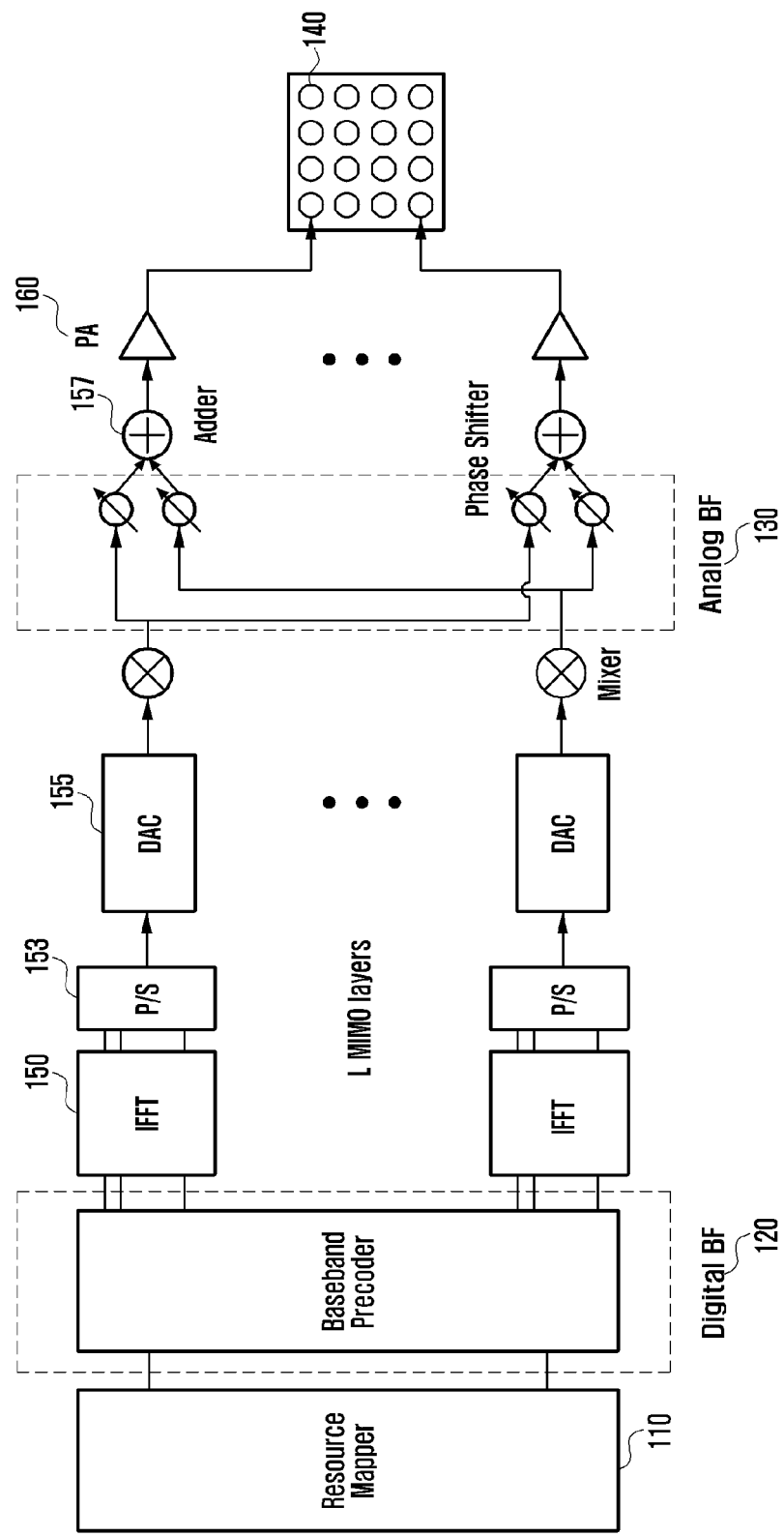
FIG. 1 is a diagram illustrating a hybrid beamforming Multiple Input Multiple Output (MIMO)-OFDM transmission structure.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms used in descriptions below are defined in consideration of the functions herein, and may be different according to users, intentions of the users, or customs. Therefore, the definitions of the terms should be determined based on the contents herein.

For convenience of description, the terms "transmitter" and "transmission side" are interchangeably used herein. Additionally, the terms "receiver" and "reception side" are interchangeably used herein. Also, a transmitter/receiver, according to an embodiment of the present invention, may include a transmitter and a receiver or a transceiver, and each transmitter/receiver may transmit and receive signals to/from another transmitter/receiver.

FIG. 1 is a diagram illustrating a hybrid beamforming MIMO-OFDM transmission structure.

Hybrid beamforming may be combined with an OFDM system, and a structure thereof may be variously implemented. Referring to FIG. 1, a hybrid beamforming transmission structure is, for example, a structure in which a beamformer including multiple RF paths is connected to a physical array antenna 140 through an adder 157. In this case, an analog beam that is different for each RF path is formed, and transmission is performed according to a scheme, such as diversity, spatial multiplexing, etc., which is identical to that of an existing MIMO-OFDM system, on a per-baseband basis. Also, in view of the amount of transmission/reception feedback, the hybrid beamforming transmission structure illustrated in FIG. 1 may be operated in such a manner that each of a digital precoder 120 and an RF beamformer 130 is limited by the number of types thereof.

Feedback to the digital precoder 120 may be operated in a form identical to that of a codebook-based Preferred Matrix Index (PMI) of an existing mobile communication system. However, the RF beamformer 130 requires new feedback, such as, for example, a beam index. As illustrated in FIG. 1, the digital precoder 120, which is different for each subcarrier, is applied to a MIMO-OFDM hybrid beamforming system, and the analog (i.e., RF) beamformer 130, which is different for each RF path, is applied to the MIMO-OFDM hybrid beamforming system. In the MIMO-OFDM system, a high Peak to Average Power Ratio (PAPR) is generated. Accordingly, an operating point of the PA, namely, the size of an average input signal, is reduced so that an input signal received by a PA 160 is linearly amplified with a high probability. Here, the degree of reducing the operating point of the PA, namely, the size of the average input signal, is referred to as "PA back-off."

In the above-described MIMO-OFDM hybrid beamforming structure, as many signals as the number of RF paths are added together by the adder 157, and then the added signals are input to the PA 160. The strength of a PA input signal changes according to a coefficient and a transmission signal of the digital precoder 120 and the RF beamformer 130. Accordingly, in view of the change in the strength of the PA input signal, it is necessary to further lower the operating point of the PA.

In view of the complexity of a hardware implementation, use is made of a PA that is identical for each antenna element of the array antenna 140, and a back-off amount is fixed so that transmission power is uniform on average. Thus, an additional back-off amount due to the hybrid beamforming structure is required to be determined in view of all of the MIMO modes to be operated in the system, in addition to a PAPR of OFDM. If the back-off amount is determined in preparation for a case where the largest strength of a signal is generated at a particular antenna element, the additional back-off amount may be previously calculated in a situation where combinations of the digital precoder 120 and the RF beamformer 130 are limited. However, when a signal is transmitted through multiple beams in the hybrid beamforming structure illustrated in FIG. 1, due to a structural characteristic in which multiple signals are added and the added signals are input to the PA, average power of actual transmission signals which are input to the respective PAs 160 may not be constant according to the selected combination of beams, the digital precoder 120, and a data stream. A resource mapper 110 performs operation related to mapping resources for transmitting signals. A IFFT 150 performs operation related to inverse fast fourier transform (IFFT) algorithm. A P/S 153 performs operation related to parallel to serial conversion. A mixer performs operation related to multiplexing signals or shifting frequency spectrum of signals. A phase shifter is used in phased arrays.

Figure 2:
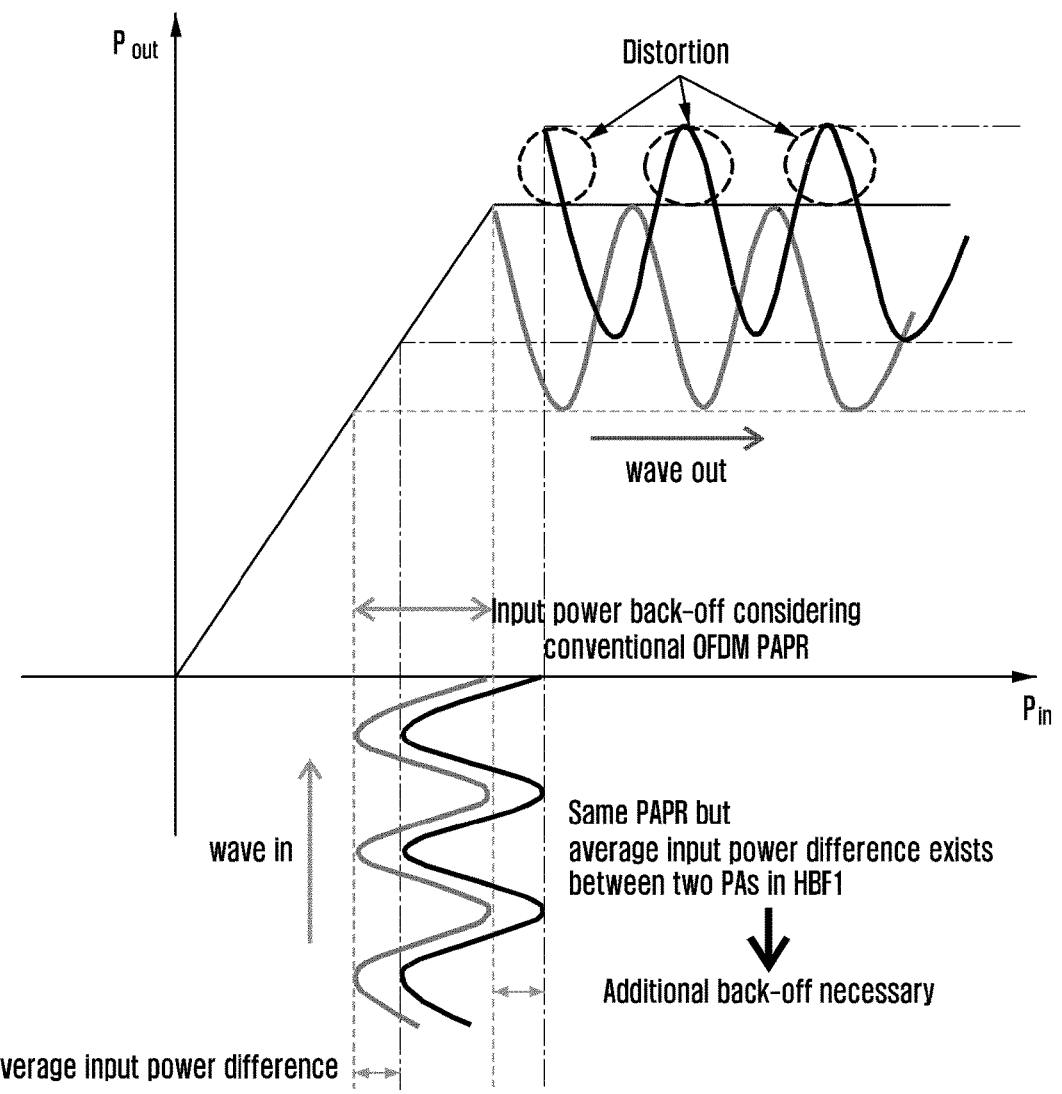
FIG. 2 is a graph illustrating a dynamic range of a PA input signal according to a combination of beams.

FIG. 2 is a graph illustrating an example of a dynamic range of a PA input signal according to a combination of beams.

Referring to FIG. 2, in a mode where a single data stream is transmitted through multiple beams among multiple MIMO modes, a range of average power of the PA input signals may be larger than that of the existing OFDM system, according to a combination of used beams.

When the dynamic range of the PA input signal is considered, the PA back-off amount in the hybrid beamforming structure illustrated in FIG. 1 is much larger than that of the existing OFDM system. Accordingly, the PA back-off amount has a direct negative effect on the efficiency of the PA. Specifically, when an input signal is output as illustrated in FIG. 2, due to a difference in average power of the input signals, distortion may occur, and the distortion occurrence has a negative effect on the efficiency of the antenna.

Hereinafter, a description is provided of a method and an apparatus which, in the hybrid beamforming structure, enable a back-off amount of a PA to meet a level identical to that of a PA back-off amount considered by the existing OFDM system. Specifically, a method and an apparatus are proposed for maintaining an average power of PA input signals to be constant regardless of a combination of beams during transmission of a single stream through multiple beams. Additionally, a description is provided of a data transmission/reception procedure and a control information transmission/reception method which accompany the above-mentioned method and apparatus.

Figure 3:
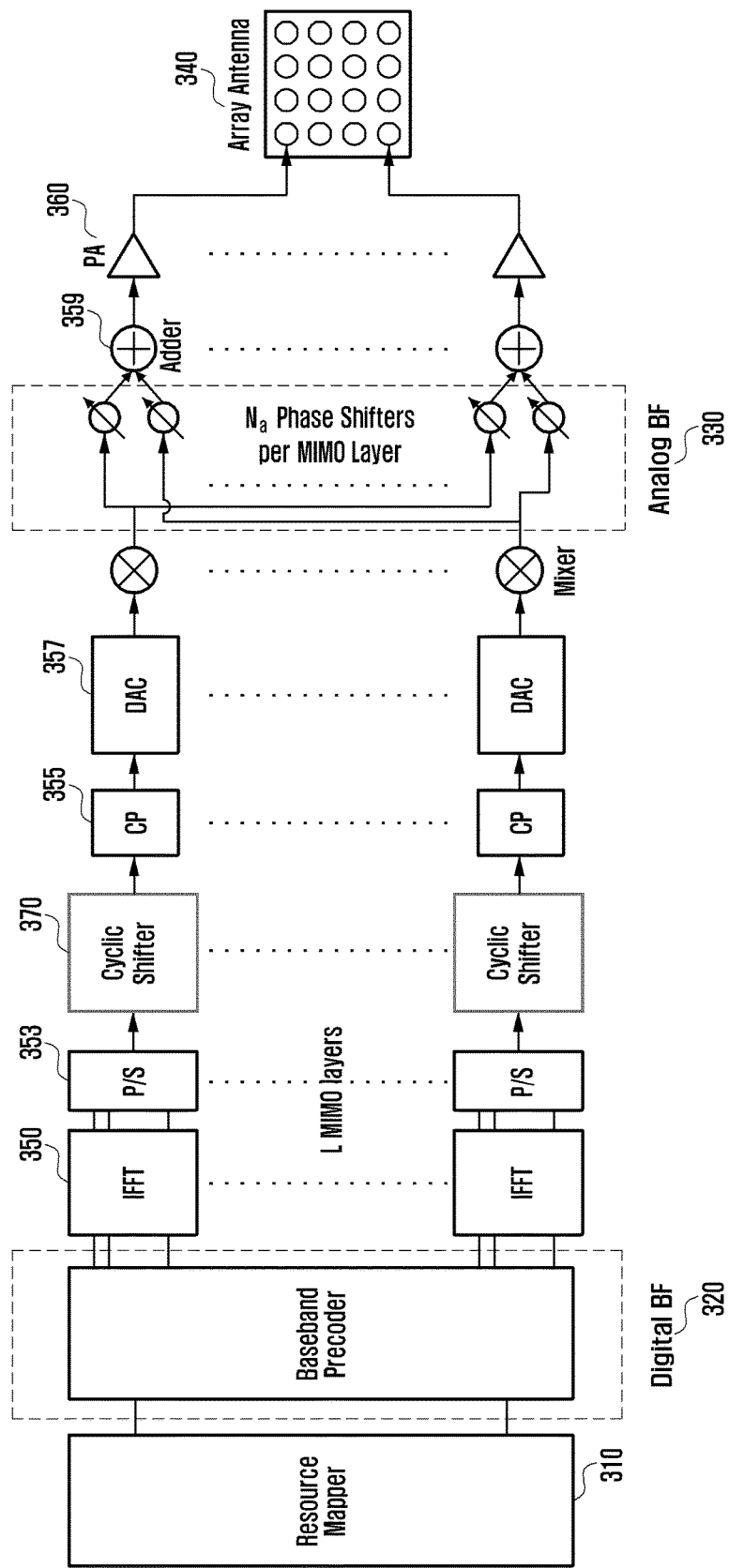
FIG. 3 is a diagram illustrating a hybrid beamforming transmission structure, according to an embodiment of the present invention.

FIG. 3 is a diagram illustrating a hybrid beamforming transmission structure, according to an embodiment of the present invention.

FIG. 3 illustrates a hybrid beamforming transmission structure in a case where an L number of beams are allocated to a single stream in an N-Fast Fourier Transform (FFT) system. Here, L has a value that is greater than or equal to 1 and is less than or equal to $N_t^c$, and $N_t^c$ represents the number of digital chains of a transmission side. L may change according to a result of user scheduling.

Referring to FIG. 3, a transmitter, according to an embodiment of the present invention, includes a resource mapper 310, a digital precoder 320, an analog beamformer 330, an adder 359 for connecting the analog beamformer 330 including multiple RF paths, a PA 360, an array antenna 340, and the like. Also, each RF path includes an Inverse Fast Fourier Transform (IFFT) 350, a Parallel-to-Serial (P/S) converter 353, a Cyclic Prefix (CP) 355, a Digital-to-Analog Converter (DAC) 357, a mixer, and the like. Here, the transmission structure, according to an embodiment of the present invention, may further include a cyclic shifter 370 for each RF path.

The analog (i.e., RF) beamformer 330 applies phase values allocated by a phase shifter to respective signals in an L number of layers. The respective signals to which the phase values have been applied are added by the adder 359, and then the added signals are applied to the array antenna 340.

As described in greater detail below, when the respective signals in the L number of layers are different transmission streams, the respective signals are distinguished from each other by using different cyclic shift values applied by the cyclic shifter 370, and the signals, which are distinguished from each other, are transmitted. A reception side applies the different cyclic shift values to the different transmission streams, and thereby distinguishes the different transmission streams from each other.

When the respective signals in the L number of layers are applied to different phase shifters and are beam-steered in different directions, the respective signals also have a beam diversity effect due to multiple beams.

The transmitter, according to an embodiment of the present invention, cyclically shifts signals after the IFFT 350 by $$\frac{iN}{L}(i=0,1,\ldots,L-1)$$

representing the number of samples through the cyclic shifter 370, respectively, and transmits the cyclically-shifted signals.

For example, when a single stream having a length of 6 is transmitted through three beams, signals allocated to the three respective beams are cyclically shifted by 0, 2 and 4, respectively, and the cyclically-shifted signals are transmitted.

When a large Cyclic Delay Diversity (CDD) is used as a cyclic delay scheme for the signals as transmitted above, cyclic shift values of the respective signals, in a situation where N and L are given, are unchangeable or fixed values.

An L number of MIMO layers respectively select values, which are mutually exclusive from each other with respect to the number L of samples for cyclic shift. According to an embodiment of the present invention, an i-th layer is not necessarily cyclically shifted by a value of $$\frac{iN}{L},$$

and the values selected by the respective layers are not identical to each other.

For example, when three layers need to select cyclic shift values, the first layer selects a cyclic shift value corresponding to a cyclic shift of 0 (i.e., not cyclically shifted), the second layer selects a cyclic shift value corresponding to a cyclic shift of N/3, and the third layer selects a cyclic shift value corresponding to a cyclic shift of 2N/3. Alternatively, according to an embodiment of the present invention, the first layer selects a cyclic shift value corresponding to a cyclic shift of N/3, the second layer selects a cyclic shift value corresponding to being not cyclically shifted, and the third layer selects a cyclic shift value corresponding to a cyclic shift of 2N/3. As described above, an L number of layers appropriately select respective cyclic shift values according to a channel state of each of the transmission side and the reception side in such a manner as not to be identical to each other.

The above-described transmission scheme may even be applied to a case where a single stream is transmitted through multiple beams to one user when not only SU-MIMO, but also MU-MIMO, is operated. Specifically, L may have a value greater than or equal to 1 and less than or equal to the number of chains of the transmission side.

Although not illustrated in FIG. 3, the transmitter may further include a control unit. The control unit controls the transmitter to control any of the above-described operations.

For example, the control unit determines whether a single stream is transmitted through multiple beams. Also, when a single stream is transmitted through multiple beams, the control unit determines which beam is used and which cyclic shift value is applied to each beam in order to transmit the single stream. Further, the control unit controls the cyclic shifter to cyclically shift the signals to be transmitted according to the respective determined cyclic shift values.

Figure 4:
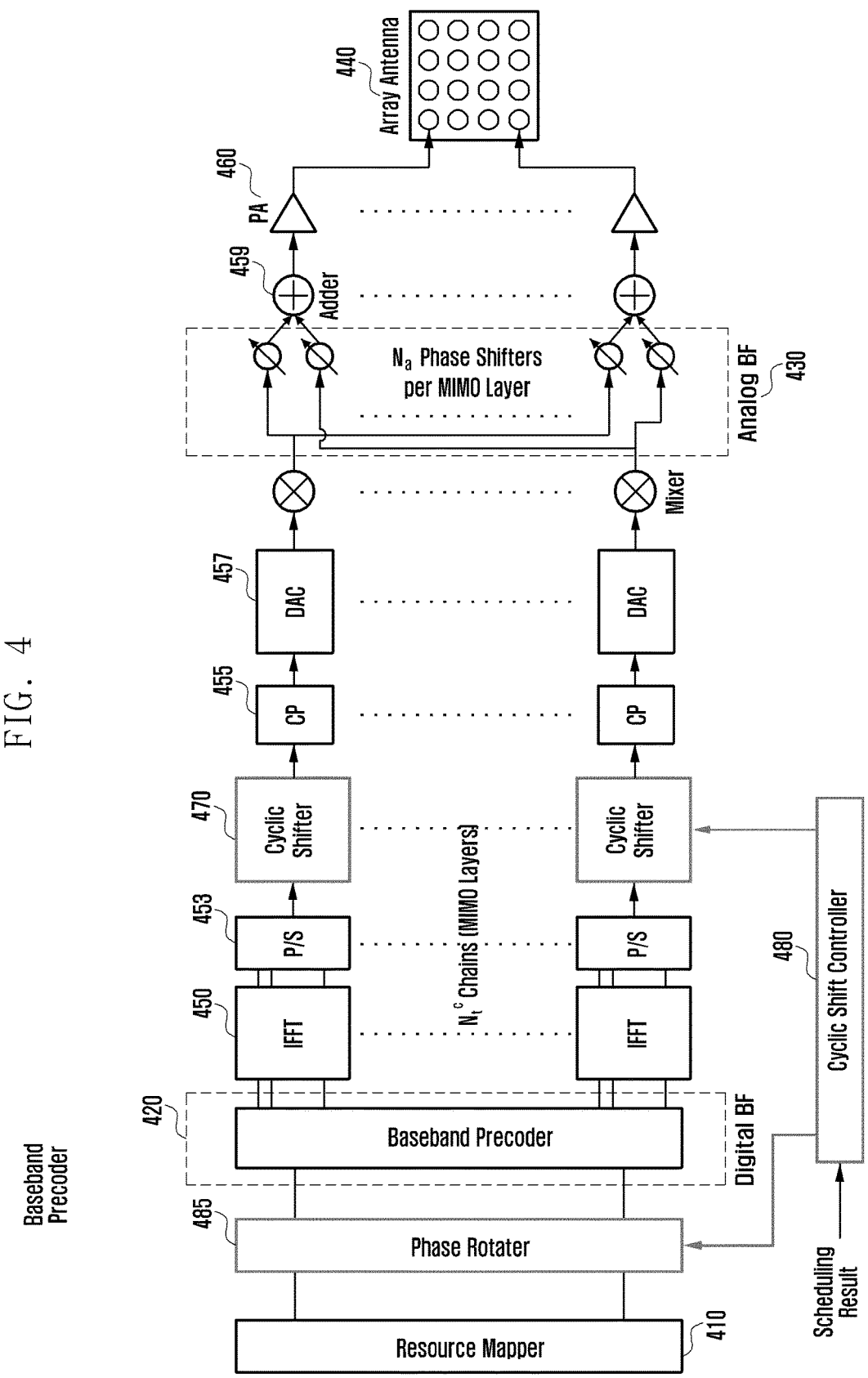
FIG. 4 is a diagram illustrating a hybrid beamforming transmission structure, according to another embodiment of the present invention.

FIG. 4 is a diagram illustrating a hybrid beamforming transmission structure, according to another embodiment of the present invention.

Referring to FIG. 4, a hybrid beamforming transmitter, according to another embodiment of the present invention, further includes a cyclic shift controller 480 and a phase rotator 485. The embodiment of the present invention illustrated in FIG. 4 implements cyclic shifts of transmission signals, which are to be transmitted through multiple beams, in a frequency domain, which differs from the embodiment of the present invention illustrated in FIG. 3.

When Orthogonal Frequency Division Multiple Access (OFDMA) is considered and when multiple users are allocated to one beam according to frequency division, the cyclic shift values are determined in the frequency domain. In this regard, the cyclic shift controller 480 determines cyclic shift values of signals, which are to be allocated to the respective beams, by using a result of scheduling. The cyclic shift controller 480 then delivers the determined cyclic shift values to the phase rotator 485, which is disposed in front of a digital precoder 420, and a cyclic shifter 470. The phase rotator 485 and the cyclic shifter 470 cyclically shift the signals, which are to be transmitted through the respective beams, by using the delivered cyclic shift values of the signals to be allocated to the respective beams, and transmit the cyclically-shifted signals through the respective beams.

In contrast, when one beam is allocated to one user (i.e., one receiver), it may be much simpler to perform processing in a time domain. Accordingly, it may be advantageous for a signal to be transmitted by the transmitter according to an embodiment illustrated in FIG. 3.

Hereinafter, a description is made of a method for transmitting and receiving information required to operate a method for cyclically shifting transmission signals and transmitting the cyclically-shifted transmission signals, according to an embodiment of the present invention.

Figure 5:
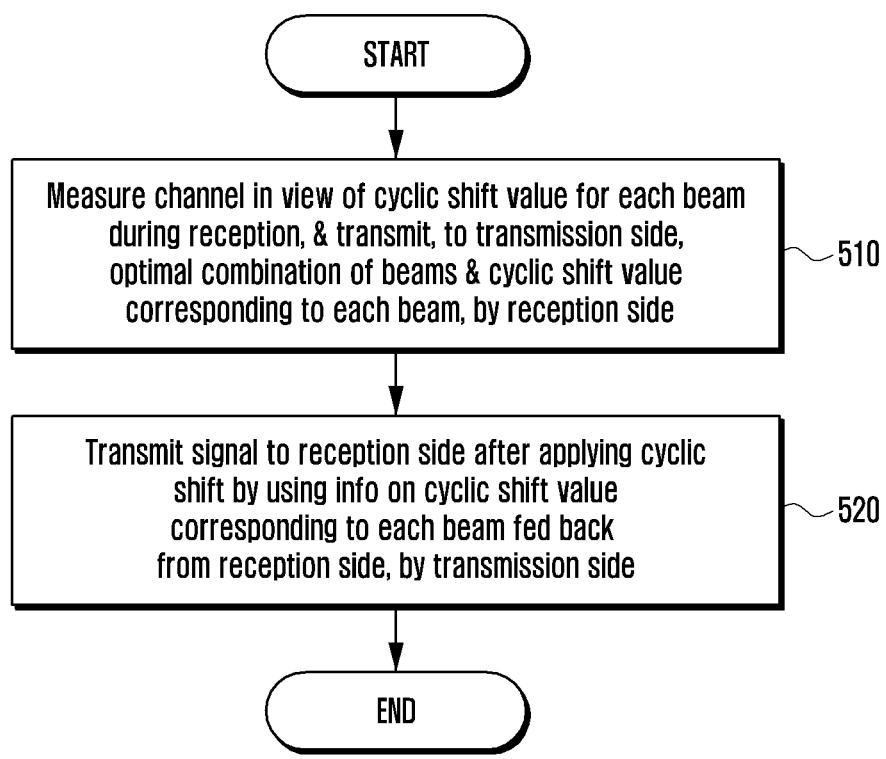
FIG. 5 is a flowchart illustrating a method for cyclically shifting transmission signals by a transmission side, according to an embodiment of the present invention.

FIG. 5 is a flowchart illustrating a method for cyclically shifting transmission signals by a transmission side, according to an embodiment of the present invention.

Referring to FIG. 5, a reception side determines which cyclic shift value is applied to which beam.

In step 510, the reception side measures a channel in view of a cyclic shift value for each beam during reception, and transmits, to a transmission side, an optimal combination of beams and a cyclic shift value corresponding to each beam.

Specifically, when the reception side performs Channel State Information (CSI) feedback (e.g., a Beam Index (BI), a PMI, a Rank Indicator (RI), a Channel Quality Indicator (CQI), etc.), the reception side determines an optimal combination that meets which cyclic shift value needs to be allocated to which beam, in the process of selecting the BI, the PMI, and the like in preparation for a case where the reception side needs to receive a single data stream through multiple beams. According to the optimal combination, the reception side transmits, to the transmission side, information on a cyclic shift value corresponding to each BI. As described above, each BI needs to correspond to information on a cyclic shift value on a one-to-one basis. Accordingly, the transmission side previously agrees with the reception side about implying that information on an i-th cyclic shift value corresponds to an i-th BI.

The information on the cyclic shift values, which has been transmitted to the transmission side, includes a cyclic shift value applied to each beam. Alternatively, according to an embodiment of the present invention, the information on the cyclic shift values, which is not a cyclic shift value itself but information in the form of a cyclic shift index, may be transmitted. A cyclic shift index is information determined to correspond to each cyclic shift value, and may be information that the transmission side previously shares with the reception side. Alternatively, the cyclic shift index may be information that is subsequently configured or changed by an information exchange between the transmission side and the reception side.

In step 520, the transmission side transmits a single stream to the relevant user (i.e., the reception side) through multiple beams after applying a cyclic shift by using the information on the cyclic shift value corresponding to each beam fed back from the reception side.

Figure 6:
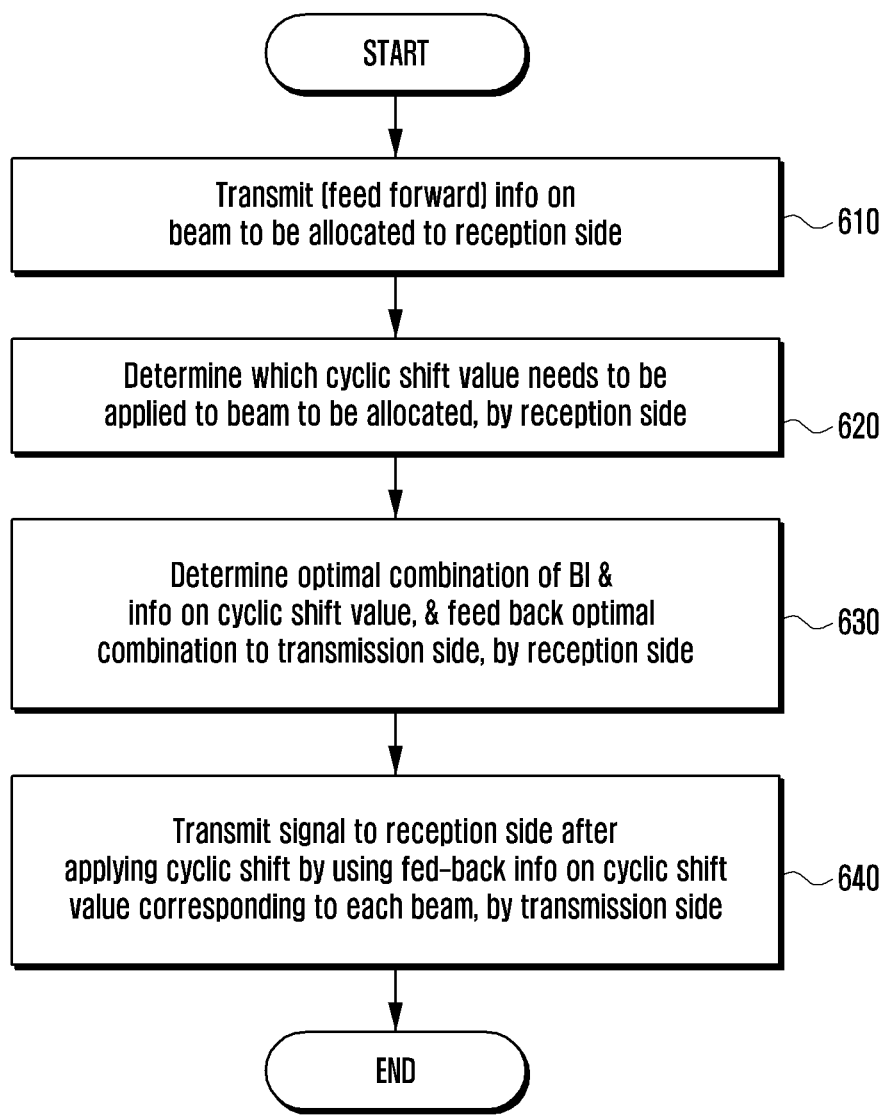
FIG. 6 is a flowchart illustrating a method for cyclically shifting transmission signals by a transmission side, according to another embodiment of the present invention.

FIG. 6 is a flowchart illustrating a method for cyclically shifting transmission signals by a transmission side, according to another embodiment of the present invention.

Referring to FIG. 6, when the transmission side transmits a single data stream through multiple beams, the transmission side designates a beam for the transmission.

Specifically, a case may occur in which the transmission side needs to transmit a single data stream through multiple beams to a current user to be scheduled. In step 610, the transmission side transmits information on a beam to be allocated to the relevant user (i.e., the reception side).

In step 620, the reception side determines which cyclic shift value needs to be applied to the beam to be allocated. In step 630, the reception side determines an optimal combination of a BI and information on a cyclic shift value, and feeds back the optimal combination to the transmission side.

In step 640, the transmission side, which has received information on a cyclic shift value corresponding to each beam as feedback from the reception side, transmits a single stream to the relevant user (i.e., the reception side) through multiple beams after applying a cyclic shift by using the fed-back information on the cyclic shift value corresponding to each beam.

Figure 7:
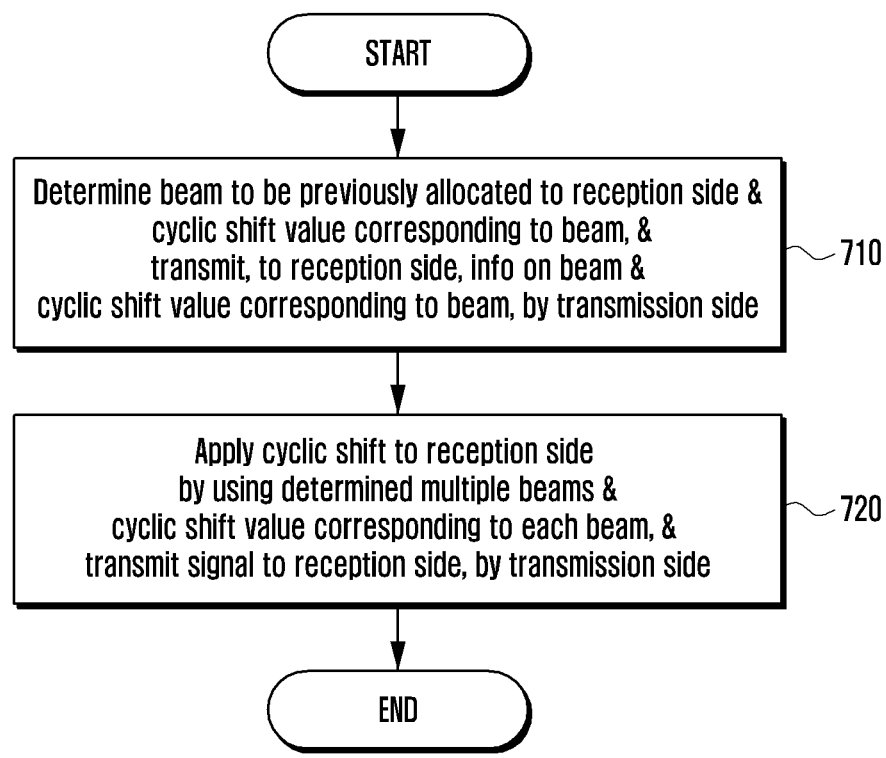
FIG. 7 is a flowchart illustrating a method for cyclically shifting transmission signals by a transmission side, according to another embodiment of the present invention.

FIG. 7 is a flowchart illustrating a method for cyclically shifting transmission signals by a transmission side, according to an embodiment of the present invention.

Referring to FIG. 7, when the transmission side transmits a single stream through multiple beams, the transmission side designates a beam for the transmission and a cyclic shift value corresponding to each beam.

Specifically, in step 710, the transmission side determines a beam to be previously allocated to a reception side, and a cyclic shift value corresponding to the beam. The transmission side then transmits, to the reception side, information on the beam to be previously allocated to the reception side and the cyclic shift value corresponding to the beam.

In step 720, the transmission side applies a cyclic shift to the relevant user (i.e., the reception side) by using the determined multiple beams and the determined cyclic shift value corresponding to each beam, and transmits a single stream to the reception side through the multiple beams.

According to an embodiment of the present invention, the transmission side does not use the information fed back from the reception side in FIGS. 5 and 6. In this case, when the transmission side performs scheduling, the transmission side does not use the information fed back from the reception side, and thus, needs to transmit information on the scheduling to the reception side. Therefore, when the transmission side transmits a single stream through multiple beams, the transmission side transmits information on a combination of beams and a cyclic shift value corresponding to the combination, which are to be used during transmission of data through a control channel. According to an embodiment of the present invention, only when the transmission side does not use the information fed back from the reception side, the transmission side transmits, to the reception side, the information on the combination of the beams and the cyclic shift value corresponding to the combination that are to be used.

Hereinafter, an example of implementing the transmitter is described, according to an embodiment of the present invention.

Figure 8:
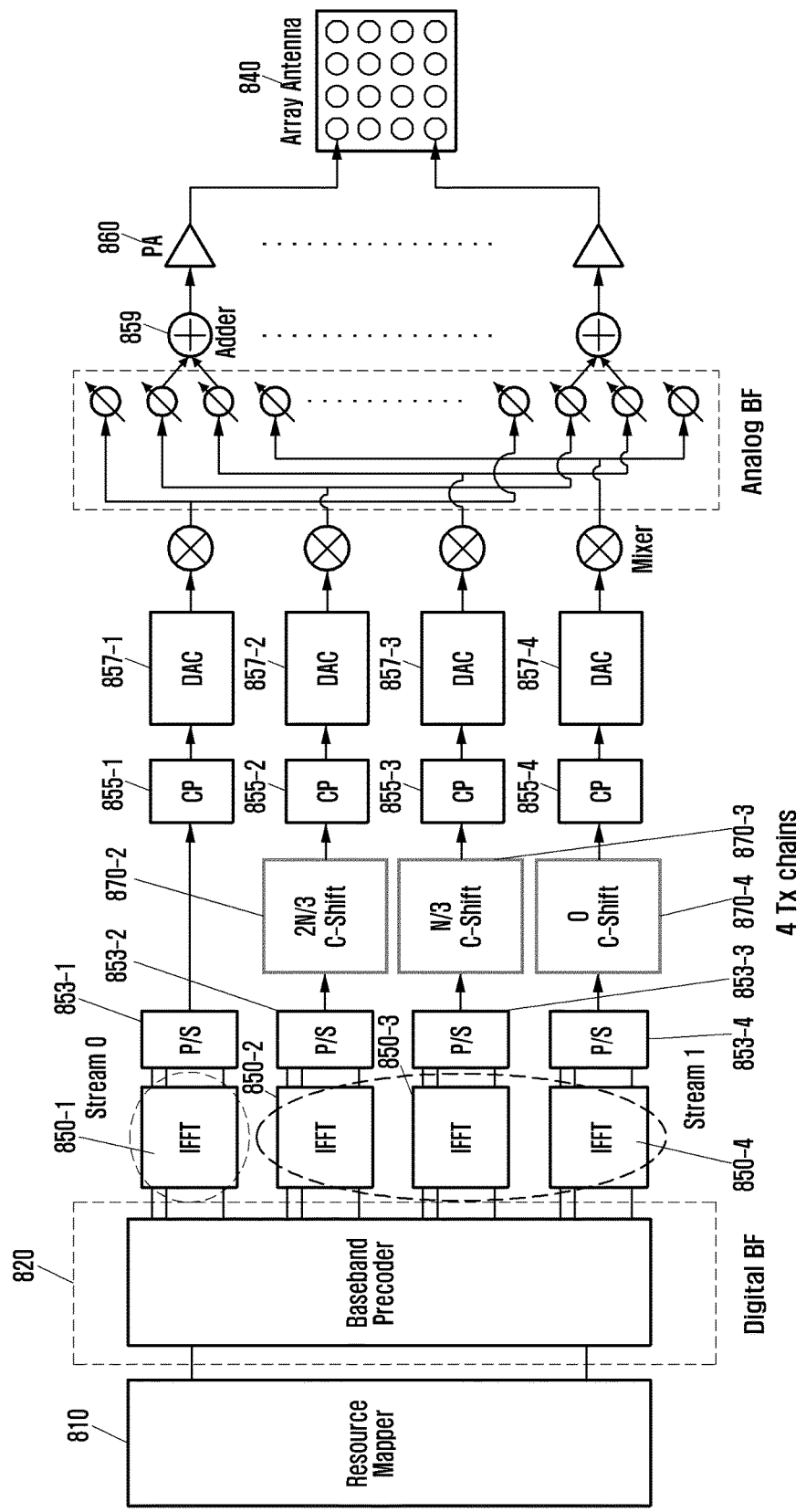
FIG. 8 is a diagram illustrating a case in which four beams are used in a hybrid beamforming transmission structure, according to an embodiment of the present invention.

FIG. 8 is a diagram illustrating a case where four beams are used in a hybrid beamforming transmission structure, according to an embodiment of the present invention.

Referring to FIG. 8, a resource mapper 810 performs operation related to mapping resources for transmitting signals. A IFFT 850-1, 850-2, 850-3, 850-4 perform operation related to inverse fast fourier transform (IFFT) algorithm. A P/S 853-1, 853-2, 853-3, 8353-4 perform operation related to parallel to serial conversion. A mixer performs multiplexing signals or shift frequency spectrum of signals. A phase shifter is used in phased arrays. CP 855-1, 855-2, 855-3, 855-4 perform operations related to cyclic prefix. C-shift 870-2, 870-3, 870-4 perform operation related to cyclic shift. DAC 857-1, 857-2, 857-3, 857-4 perform operation related to digital to analog convert. Adder 859 performs operation to add respective signals to which phase values have been added, and the added signals are applied to the array antenna 840. PA 860 performs operation related to amplification of power of signals.

Referring to FIG. 8, a case is described in which two streams are transmitted in a system where the number $N_t^c$ of digital chains of the transmission side is equal to 4. In this case, three beams are allocated to one of the two streams.

The first stream (i.e., stream 0) is allocated to a first RF path and is transmitted through the first RF path. The first stream is transmitted through a single beam, and thus, the transmission beam is not cyclically shifted. In FIG. 8, in order to clearly indicate that a cyclic shift value is not applied to the first stream, a cyclic shifter is not illustrated along the first RF path.

The second stream (i.e., stream 1) is transmitted through a second RF path to a fourth RF path. Three beams are allocated to the second stream, and thus, a signal transmitted through each RF path are cyclically shifted by the above-described value of $$\frac{iN}{L}.$$

Specifically, the transmission signals are cyclically shifted by 0, N/3, and 2N/3, respectively.

As illustrated in FIG. 8, the respective cyclic shift values 0, N/3, and 2N/3 are not sequentially applied to the beams transmitted through the second RF path to the fourth RF path. Specifically, the cyclic shift value of 2N/3 is applied to the beam transmitted through the second RF path, and the cyclic shift value of N/3 is applied to the beam transmitted through the third RF path. Also, the cyclic shift value of 0 (i.e., not cyclically shifted) is applied to the beam transmitted through the fourth RF path.

When the transmitter transmits the second stream through the multiple beams, which beam is used and which cyclic shift value is applied to which beam is determined by the transmitter or the receiver, according to the above-described embodiment.

For example, when the receiver performs CSI feedback, the receiver determines that the single stream (i.e., the second stream) is received through the second beam to the fourth beam and that the cyclic shift values of 2N/3, N/3 and 0 are respectively allocated to the second beam to the fourth beam. The receiver then feeds back, to the transmitter, information on each selected beam and the cyclic shift value allocated to each selected beam. According to the fed-back information, the transmitter transmits the second stream through the second beam to the fourth beam. The transmitter cyclically shifts the second stream by 2N/3, cyclically shifts a third stream by N/3, and transmits the cyclically-shifted signals.

Alternatively, the transmitter may determine that the second stream is transmitted through the second beam to the fourth beam, and may notify the receiver of information on the determination. The receiver may then determine cyclic shift values to be applied to the second beam to the fourth beam, and may feed back the determined cyclic shift values to the receiver. By using the fed-back information on the cyclic shift value corresponding to each beam, the transmitter may transmit the second stream to the receiver through the second beam to the fourth beam, as described above.

When the transmission structure, according to an embodiment of the present invention, is used as described above, regardless of a digital precoder and a combination of analog beams during transmission of a single stream through multiple beams, average power of input signals to all the PAs after the respective adders are always maintained as in the case of analog beamforming (i.e., transmission of a single stream through a single beam).

Specifically, although a single stream is transmitted through multiple beams when Single User (SU)-MIMO or Multiple User (MU)-MIMO is operated, average power of all PA input signals are always maintained as in the case of single-beam transmission (i.e., analog beamforming), regardless of a digital precoder and a combination of analog beams.

Also, a constant modulus property at a PA input side may be generated, so that the overall average transmission power can be naturally normalized.

Further, when a PA back-off amount is determined, a PAPR or a Peak-to-Mean-Envelope-Power Ratio (PMEPR) of a signal itself only needs to be considered, as in the case of the existing OFDM system, without an additional back-off (i.e., an alpha value due to 10 $\log_{10}$ L dB and the normalization of transmission power). In addition, an increase in PA efficiency and an identical PA can increase a cell coverage.

Further, it is possible to maintain the PA cost gain of the existing MIMO system capable of using multi-antenna PA having a small capacity instead of a single antenna PA having a large capacity.

In addition, an increase in PA power efficiency and an identical PA can increase a cell coverage.

It is to be appreciated that the term "processor", as used herein, is intended to include any processing device, such as, for example, one that includes a Central Processing Unit (CPU) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, Random Access Memory (RAM), Read Only Memory (ROM), a fixed memory device (e.g., hard drive), a removable memory device, flash memory, etc.

In addition, the phrase "input/output devices" or "I/O devices", as used herein, is intended to include, for example, one or more input devices for entering information.

Still further, the phrase "network interface", as used herein, is intended to include, for example, one or more transceivers that to permit the system to communicate with another system via an appropriate communications protocol.

Software components including instructions or code for performing the methodologies described herein may be stored in one or more of the associated memory devices (e.g., ROM, fixed, or removable memory) and, when ready to be utilized, loaded in part or in whole (e.g., into RAM) and executed by the CPU.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for controlling a transmission signal in a first transceiver, the method comprising:
    receiving, from a second transceiver, information including cyclic shift values corresponding to each beam index of multiple layers of the first transceiver, wherein the cyclic shift values to be applied to multiple layers of the first transceiver are determined by the second transceiver based on channel state information feedback;
    generating signals to be transmitted to the second transceiver;
    identifying cyclic shift values that are applied to the signals corresponding to the multiple layers based on the received information including the cyclic shift values;
    cyclically shifting the signals according to the identified cyclic shift values; and
    transmitting the cyclically-shifted signals to the second transceiver,
    wherein each cyclic shift value that is applied to each layer of the first transceiver is different from each other.

2. The method of claim 1, wherein identifying the cyclic shift values comprises determining a cyclic shift value that is applied to a single stream signal, when the single stream signal is to be transmitted through the multiple layers.

3. The method of claim 1, wherein the cyclic shift values are determined according to a large Cyclic Delay Diversity (CDD) scheme.

4. The method of claim 1, wherein the cyclic shift values are determined according to $$\frac{iN}{L}(i=0,1,\ldots,L-1),$$

where N represents a size of each of the signals and L represents a number of the multiple layers.

5. The method of claim 1, wherein cyclically shifting the signals comprises:
    selecting cyclic shift values from the determined cyclic shift values in such a manner that the selected cyclic shift values respectively correspond to the signals; and
    cyclically shifting the signals according to the selected cyclic shift values.

6. The method of claim 1, further comprising,
    receiving, from the second transceiver, information on the multiple layers of the first transceiver to be used for transmitting the signals to the second transceiver; and
    wherein the cyclic shift values are identified by the first transceiver based on the information on the multiple layers and the information including the cyclic shift values.

7. The method of claim 1, further comprising,
    transmitting information on the multiple layers of the first transceiver to the second transceiver,
    wherein the information including the cyclic shift values corresponds to the information on the multiple layers of the first transceiver.

8. The method of claim 1, further comprising transmitting, to the second transceiver, information on the multiple layers and information on the cyclic shift values.

9. A first device comprising:
    a controller configured to:
    receive, from a second device, information including cyclic shift values corresponding to each beam index of multiple layers of the first device, wherein the cyclic shift values to be applied to multiple layers of the first transceiver are determined by the second device based on channel state information feedback,
    generate signals to be transmitted to the second device,
    identify cyclic shift values that are applied to the signals corresponding to the multiple layers based on the received information including the cyclic shift values, and
    cyclically shift the signals according to the identified cyclic shift values; and
    a transceiver configured to
    transmit the cyclically-shifted signals to the second device,
    wherein each cyclic shift value that is applied to each layer of the first transceiver is different from each other.

10. The first device of claim 9, wherein the controller is further configured to identify a cyclic shift value that is applied to a single stream signal when the single stream signal is to be transmitted through the multiple layers.

11. The first device of claim 9, wherein the cyclic shift values are determined according to a large Cyclic Delay Diversity (CDD) scheme.

12. The first device of claim 9, wherein the cyclic shift values are determined according to $$\frac{iN}{L}(i=0,1,\ldots,L-1),$$

where N represents a size of each of the signals and L represents the number of the multiple layers.

13. The first device of claim 9, wherein the controller is further configured to select cyclic shift values from the determined cyclic shift values in such a manner that the selected cyclic shift values respectively correspond to the signals, and cyclically shift the signals according to the selected cyclic shift values.

14. The first device of claim 9, wherein the transceiver is further configured to receive, from the second device, information on the multiple layers of the first device to be used for transmitting the signals to the second device, and wherein the cyclic shift values are identified by the first device based on the information on the multiple layers and the information including the cyclic shift values.

15. The first device of claim 9, wherein the transceiver is further configured to transmit information on the multiple layers of the first device to the second device,
   wherein the information including the cyclic shift values corresponds to the information on the multiple layers of the first transceiver.

16. The first device of claim 9, wherein the transceiver is further configured to transmit, to the second device, information on the multiple layers and information including the cyclic shift values.

17. An article of manufacture for controlling a transmission signal, comprising a non-transitory machine readable medium containing one or more programs, which when executed implement:

receiving, from a second transceiver, information including cyclic shift values corresponding to each beam index of multiple layers of a first transceiver, wherein the cyclic shift values to be applied to multiple layers of the first transceiver are determined by the second transceiver based on channel state information feedback;
   generating signals to be transmitted to the second transceiver;
   identifying cyclic shift values that are applied to the signals corresponding to the multiple layers based on the received information including the cyclic shift values based on the information including the cyclic shift values;
   cyclically shifting the signals according to the identified cyclic shift values; and
   transmitting the cyclically-shifted signals to the second transceiver,
   wherein each cyclic shift value that is applied to each layer of the first transceiver is different from each other.

* * * * *